Sept. 13, 1966  E. M. LANGHAM  3,273,052
INDUCTIVE POSITION INDICATOR SYSTEM
Filed July 5, 1963  4 Sheets-Sheet 1

INVENTOR
Eric Miles Langham
BY McGlew and Toren
ATTORNEYS

Sept. 13, 1966  E. M. LANGHAM  3,273,052
INDUCTIVE POSITION INDICATOR SYSTEM
Filed July 5, 1963  4 Sheets-Sheet 2
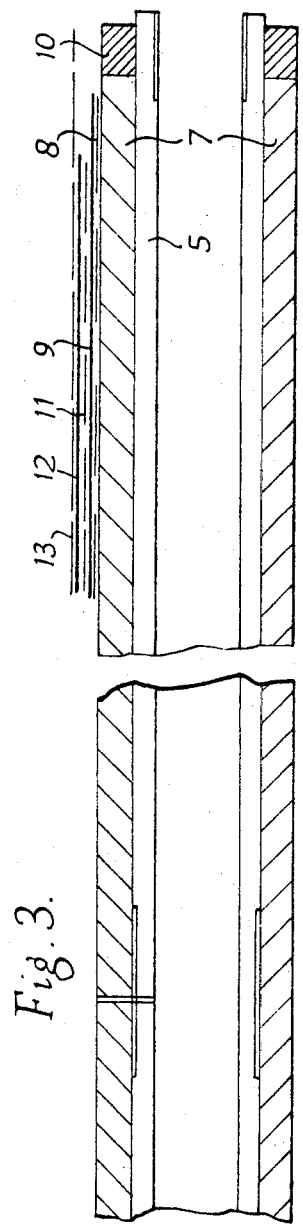
Fig. 3.
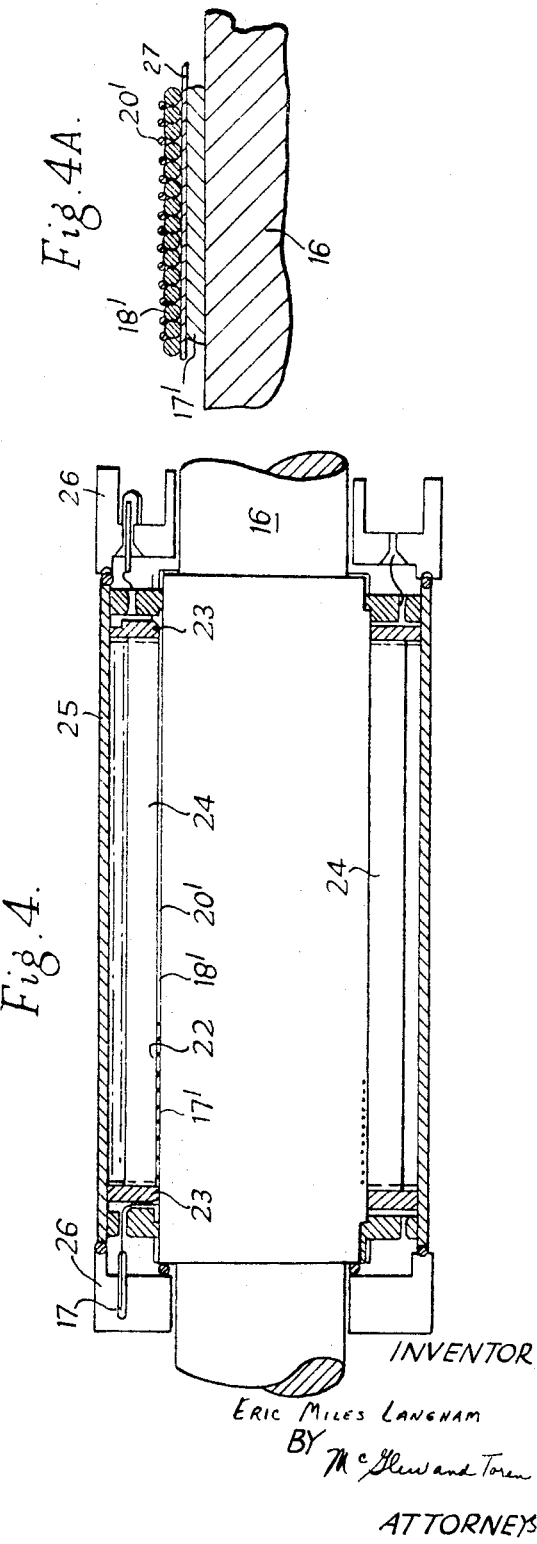
Fig. 4A.
Fig. 4.
INVENTOR
Eric Miles Langham
BY McGlew and Toren
ATTORNEYS Sept. 13, 1966            E. M. LANGHAM            3,273,052
INDUCTIVE POSITION INDICATOR SYSTEM
Filed July 5, 1963            4 Sheets-Sheet 3
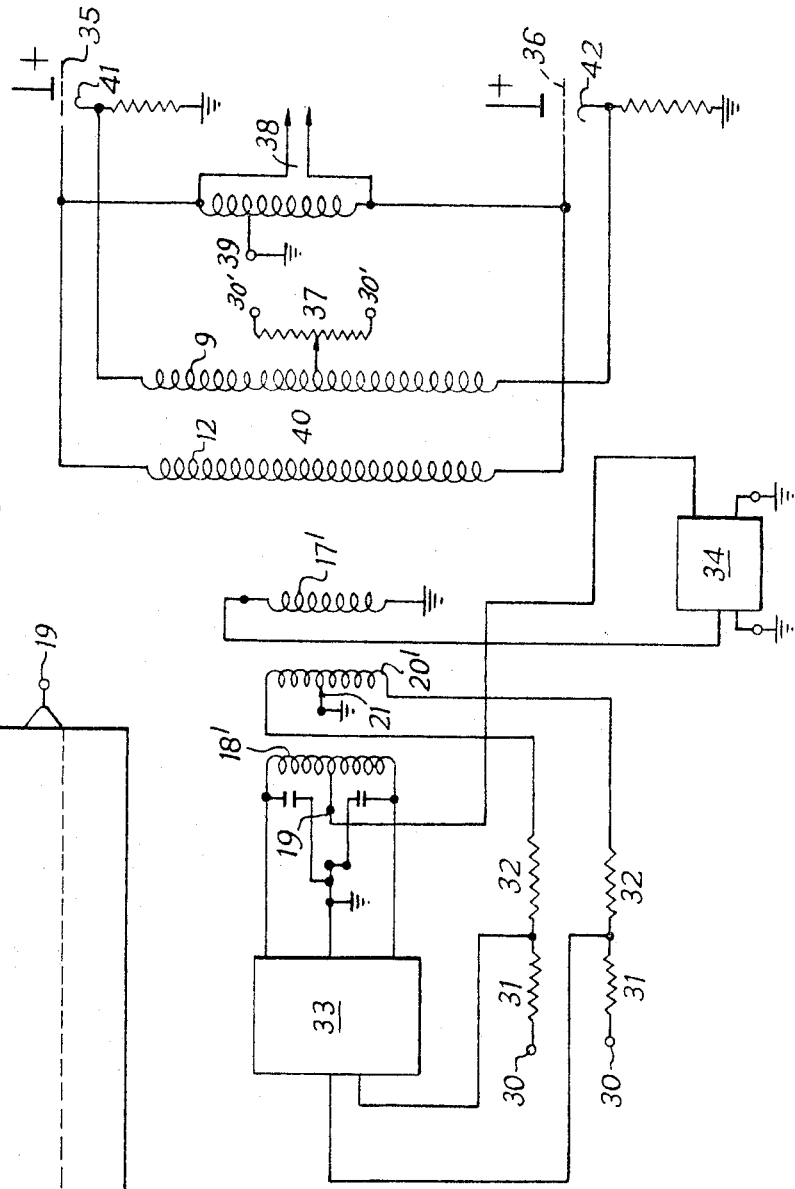
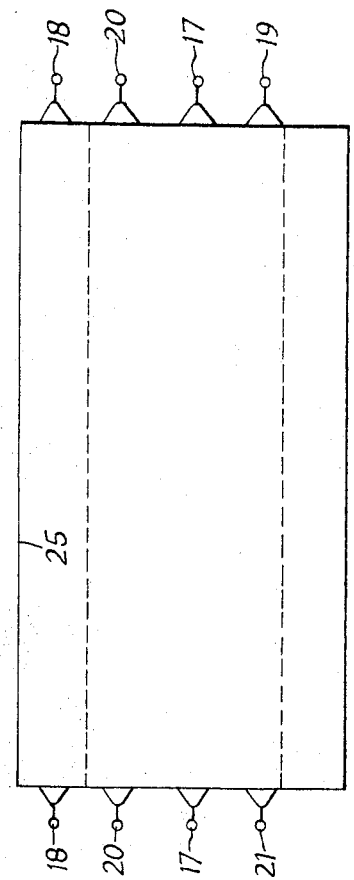
INVENTOR
Eric Miles Langham
BY
McGlew and Toren
ATTORNEYS

United States Patent Office 3,273,052
Patented Sept. 13, 1966

3,273,052
INDUCTIVE POSITION INDICATOR SYSTEM
Eric Miles Langham, 14 The Close, Norwich,
Norfolk, England
Filed July 5, 1963, Ser. No. 292,904
Claims priority, application Great Britain, Mar. 3, 1958,
6,814/58
16 Claims. (Cl. 323—48)

This application is a continuation-in-part of copending application Serial No. 796,792, filed March 3, 1959, for "Electrical Measuring Devices," and now abandoned.

The present invention relates to an electrical measuring device which is particularly applicable to the accurate recording of distances moved from a datum point, for example, the movements of a workpiece, tool or worktable relatively to the bed of a machine tool.

According to the present invention, an electrical measuring device for measuring the relative position of two relatively movable parts comprises first and second elongated members which are adapted to be coupled to the respective parts so that relative movement of the parts causes relative linear movement of the members, a first distributed winding extending along the first member parallel with the direction of the relative linear movement and including oppositely wound sections extending respectively in opposed directions from a datum point of the first member, each section having a progressively varying turns density along the first member with the turns density in any selected point therealong linearly proportional to the distance of the selected point from the datum point, and a second distributed winding extending along the second member parallel with the direction of the relative linear movement, the second winding being of smaller extent than that of the first winding, whereby when the first and second members are so disposed that the first winding extends beyond the second winding in opposite directions from the datum point and an A.C. potential is applied to the second winding an E.M.F. of magnitude linearly proportional to the relative positions of the said members is induced in the first winding.

The invention will now be described, by way of example, with reference to the accompanying drawings, in which:

FIGURES 2 and 3 are respectively a side elevation view and a partial axial sectional view of the rod;

FIGURES 4 and 4A are respectively an axial sectional view and a partial axial sectional view of the sleeve;

FIGURE 5 is a side elevation view of the sleeve;

FIGURE 6 is a schematic electrical circuit for use on the measuring device shown in FIGS. 1 to 5.

Figure 1:
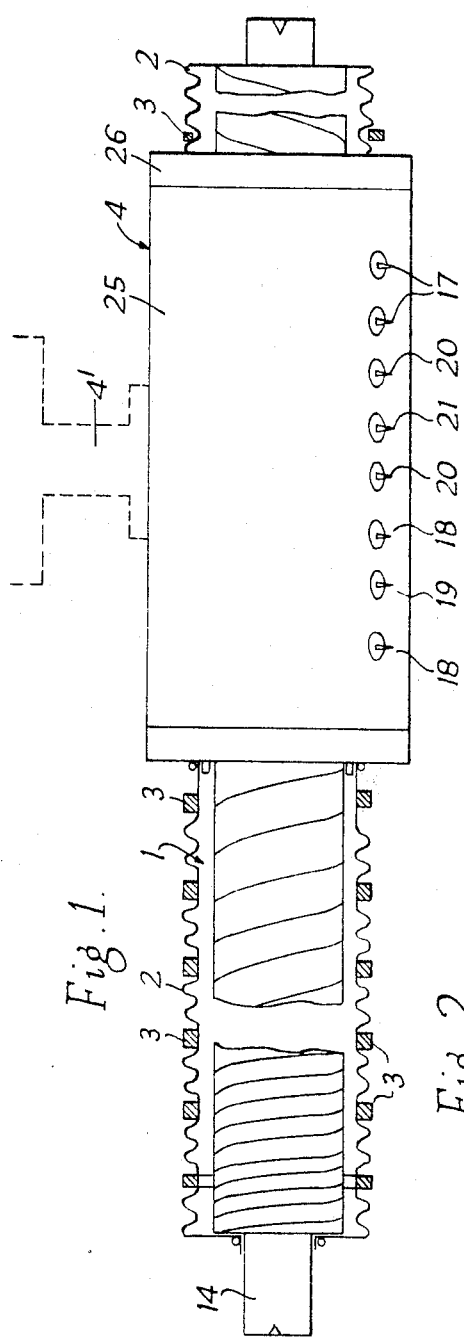
FIGURE 1 is a side elevation of first and second members of a first device according to the invention, respectively in the form of a rod and a sleeve.

In the measuring device as shown in FIGURE 1, a rod, generally designated 1, carries a magnetic circuit and windings and is fixed in relation to the movement to be measured. A sleeve, generally designated 4 and extending along a minor part only of the rod 1, is also provided with a magnetic circuit and windings and is fixed as by a clamp 4' to the part whose movement is to be measured. For example, the rod may be fixed to the body of a bed or a machine tool and the sleeve to the machine tool table.

To protect the rod 1 from the ingress of dirt and the like, a bellows 2 is provided encircling the rod, this bellows being manufactured of magnetic material in order to provide a magnetic shunt for stray fields, or of rubber, synthetic plastic or other suitable flexible material. Metal rings 3 are provided at intervals along the bellows 2 as a further aid to the elimination of stray magnetic fields.

Figure 2:
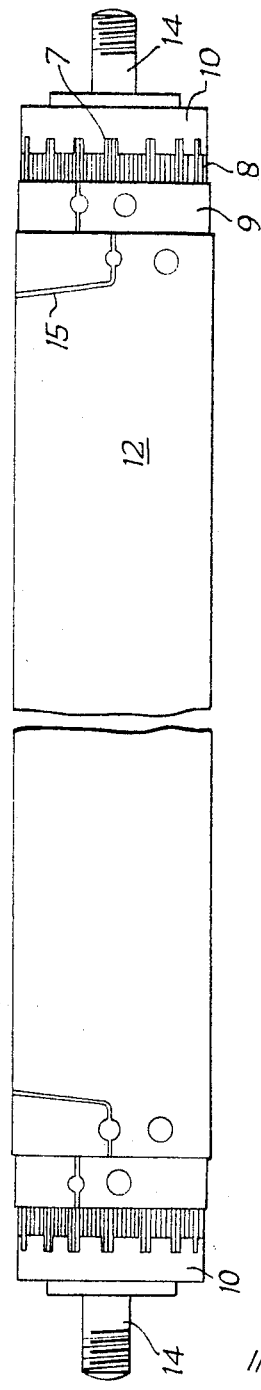

As shown in more detail in FIGURES 2 and 3, the rod 1 comprises a tube 6 manufactured from material of high strength and rigidity but preferably having a low temperature coefficient of expansion. Strips 7 of a material having a high magnetic permeability, such as "Mu-Metal," are disposed in slots in the exterior of the tube 5 with the longitudinal axis of each strip parallel wiht the longitudinal axis of the tube and the strips equi-spaced radially round the tube. The strips are held in place radially by cementing, for example, with a material such as "Araldite," and are located longitudinally of the tube by end caps 10, through which is passed a supporting spindle 14.

A layer 8 of insulation is provided on the strips 7 and this in turn is covered by a winding 9 which includes oppositely wound sections extending in opposed axial directions from a datum point at the longitudinal center of the rod. At this datum point the wire forming the winding extends parallel with the axis of the rod so that the helix angle, i.e., the angle between the wire and a diametric plane of the rod, is 90°. At any other selected point along the rod the cotangent of the helix angle is linearly proportional to the distance between that point and the datum point. The turns density of the winding is therefore progressively variable along the rod with the turns density at any selected point linearly proportional to the distance of that point from the datum point and the total number of turns between the selected point and the datum point linearly proportional to the square of that distance.

The winding 9 may be formed from a copper tube formed with a sawcut of variable pitch which is shrunk or pressed over the insulation. Alternatively the winding may be formed by an equivalent method, for example by photo-etching, or by cutting a groove into the magnetic material and pressing a conductive wire into the groove.

Another layer of insulation 11 is provided exteriorly of the winding 9 and another sawcut copper tube, forming a winding 12 similar to the winding 9, is provided on the outside of the insulation 11. The start of the sawcut is shown at 15 in FIGURE 2.

Conveniently, the complete assembly is provided with an overall layer of insulation 13, shown in FIGURE 3, but not in FIGURE 2.

The complete assembly of rod is encased in the bellows 2, as shown in FIGURE 1.

The sleeve construction is illustrated in FIGURES 4, 4A and 5.

A collapsible mandrel 16, see FIGURES 4 and 4A, is wound with a thin layer of insulation which may be of "Melanex" tape, and over this is passed a copper tube. This copper tube is provided with a variable pitch sawcut provided on the copper tubes of the rod, thereby forming a winding 17'. Connections are brought out from the ends of this winding to terminals 17, see FIGURES 1 and 5.

Over the copper tube is a layer of insulation 27 and over the insulation a winding 18' having a uniform turns density (hereinafter called the thick wire winding) and comprising a single layer of conductors is provided. The ends of the winding 18' are brought out to terminals 18, see FIGURES 1 and 5, and the winding is provided with a center tap which is brought out to terminal 19. Over this winding, and in the ridges between the turns thereof, is wound another winding 20' of thin wire, the ends of which are brought out to terminals 20. The winding 20' is also provided with a center tap which is brought out to terminal 21.

The various windings 17', 18' and 20' just described are shown together at 22 in FIGURE 4.

End rings 23 are placed over the tube 17' and the windings 22 and are provided with serrations to locate longitudinally extending strips 24 around the windings. Conveniently the strips 24 are made of "Mu-Metal."

Encasing the ends rings 23 and the "Mu-Metal" strips is an outer casing or cylinder 25 and the assembly is impregnated with Araldite or equivalent material to hold and lock the parts together and end caps 26 are provided. The collapsible mandrel 16 is then removed.

The schematic circuit shown in FIGURE 6 is for use in the measuring device to provide a voltage proportional to the relative linear positions of the sleeve and the rod.

A transformer, not shown in this drawing, has its primary winding energized with an alternating voltage and is provided with a center tapped secondary winding whose center tap is grounded and whose outer ends are connected to terminals 30. The terminals 30 form one input to a pushpull additive network comprising resistors 31 and 32, the other input to the additive network being the output from the winding 20', which is the thin wire winding on the sleeve. The center tap 21 of the winding 20' is grounded.

The output of the additive network is connected to the input of a high-gain feedback amplifier 33 whose output energizes the thick wire winding 18' of the sleeve 4. The polarities of the connections to the feedback amplifier 33 are such that the output of the additive network tends to zero, i.e., the output voltage applied to terminals 18 of winding 18' by the feedback amplifier 33 is so adjusted that the voltage induced in winding 20' is very closely equal to the reference voltage applied to terminals 30, assuming that the resistors 31 and 32 of the additive network are of equal magnitude.

One end of the winding 17' on the sleeve 4 is grounded and the other end is connected to the input of a further feedback amplifier 34. One terminal of the output of feedback amplifier 34 is grounded and the other terminal is connected to the center tap 19 of the thick wire winding 18' on the sleeve. The pushpull output of feedback amplifier 33, which is fed to thick wire winding 18', has a center tap which is grounded. Accordingly, the output of the further feedback amplifier 34 adds to the voltage applied to the one half of the thick wire winding 18' and substracts from the other half, so that voltages appearing at the output of feedback amplifier 34 change the flux distribution along the sleeve 4.

The polarities of the connections to the feedback amplifier 34 are arranged so that the voltage appearing at the terminals of winding 17' tends to zero.

As will be described hereinafter an A.C. potential applied to the winding 18' of the sleeve causes a voltage proportional to the distance between the center of the sleeve and the center of the rod to be induced in the outer winding 12 of the rod 1. Inaccuracies in this voltage may be caused by capacitive currents flowing between the winding and the core of the rod. To minimize these capacitive currents the terminals of the winding 12 are connected to the grids 35, 36 of respective cathode followers. The cathodes 41, 42 of these cathode followers are connected to the ends of the inner winding 9 of the rod so that the capacitive currents flow along the inner winding 9 instead of the outer winding 12.

The adjustable contact of a potentiometer 37 is connected to a center tap 40 of the inner winding 9 and may be adjusted manually as a further control upon the capacitive currents flowing in the inner winding 9. The ends of potentiometer 37 are connected respectively to the two terminals 30' which are supplied with the same input as terminals 30.

In order that the voltage at the terminals of winding 12 may be pushpull symmetrically with respect to ground a center tapped auto-transformer 38 may be provided, having its ends connected to the terminals of the winding 12 and its center tap 39 grounded.

The operation of the device is as follows.

The outer winding 12 on the rod is of similar form to the winding 9 in that it includes oppositely wound sections extending in opposed axial directions from a datum point at the longitudinal center of the rod with the turns density at any selected point along the winding linearly proportional to the axial distance of the selected point from the datum point. Thus, the turns density at a distance $s$ from the datum point is equal to $ks$, where $k$ is a constant, and the total number of turns within the distance $s$, which is the integral of the turns density, is equal to $ks^2$.

At two selected points located at distances $(s+\Delta s)$ and $(s-\Delta s)$, respectively, from the datum point the turns density is $k(s+\Delta s)$ and $k(s-\Delta s)$, respectively, and the total number of turns between the points and the datum point is $k(s+\Delta s)^2$ and $k(s-\Delta s)^2$, respectively. The total number of turns in the interval $s$ between the two selected points is $[k(s+\Delta s)^2]$, i.e., $4ks\Delta s$.

It will be seen, therefore, that the total number of turns within a distance $\Delta s$ centered a distance $s$ from the datum point is linearly proportional to $s$. If the distance $\Delta s$ is centered on the datum point the total number of turns within that distance is zero, bearing in mind that the two sections of the winding are oppositely wound and counting clockwise as positive and anticlockwise turns as negative.

When the uniform winding 18' on the sleeve is supplied with an A.C. potential from a constant voltage source the E.M.F. induced in winding 12 is of magnitude proportional to the number of turns of that winding disposed within the sleeve.

Since this number is linearly proportional to the distance between the longitudinal center of the rod and the longitudinal center of the sleeve the magnitude of the induced E.M.F. is likewise linearly proportional to that distance, and hence provides a measure of the relative positions of the sleeve and rod.

If the air gap between the uniform winding 18' on the sleeve and the winding 12 on the rod is not symmetrical the magnetising current flowing in the winding 18', and hence the total flux within the sleeve, varies with the position of the sleeve relative to the rod. Since the E.M.F. induced in the winding 12 is proportional to this total flux it will be subject to random variations and depart from the linear relationship with position described above.

It is for the purpose of removing the error voltage constituted by these variations in E.M.F. that the thin wire winding 20' is provided on the sleeve. Winding 20' is of uniform turns density so that the E.M.F. induced therein by current flowing in the winding 18' is proportional to the total flux linking winding 20' but independent of its distribution. As described above, the additive network and feedback amplifier 33 are arranged to control the current in winding 18' so that the E.M.F. in winding 20' is of constant magnitude equal to that of the reference voltage applied to terminals 30. The total flux within the sleeve is therefore maintained at a constant value independently of the relative axial positions of the sleeve and rod.

As stated above, the E.M.F. induced in winding 20' by the A.C. potential in winding 18' is independent of the flux distribution. The total number of turns in the portion of the rod winding 12 within the sleeve is linearly proportional to the distance between the datum point on the rod and the datum point on the sleeve, however, and within this portion the turns density varies, the turns being crowded together at one end and further apart at the other. If the flux distribution is not symmetrical with respect to the longitudinal center of the sleeve the crowded turns, say, will have more than their share of the total flux and accordingly produce too high a voltage.

It is for the purpose or removing errors in voltage arising from a non-symmetrical flux distribution that the winding 17' is provided on the sleeve.

As stated above, the total number of turns between any selected point on the winding 12 on the rod and the datum point is proportional to the square of the distance between the selected point and the datum point, i.e., a plot of the total number of turns against distance from the datum point is of parabolic form. The portion of the winding 12 lying within the sleeve when the latter is centered on any selected point along the length of the rod is represented by an arc of this parabolic.

This parabolic arc can be considered as made up of two components. Firstly, a straight line component and, secondly, a parabolic component centered on the longitudinal center of the sleeve. The parabolic winding can therefore be considered as two separate windings connected in series. The first winding, represented by the straight line component, has a uniform turns density along its length and this turns density, and hence the total number of turns, is proportional to the distance between the center of the sleeve and the datum point of the rod winding 12. The second winding is identical with the central part of winding 12.

When an A.C. potential is applied to the winding 18' on the sleeve the first component of the winding 12 gives rise to an E.M.F. which is dependent upon the number of turns in the first component of winding 12 and the flux within winding 18' but independent of the flux distribution. The E.M.F. induced due to the second, parabolic component is very sensitive to flux distribution, however, since the turns are clockwise over one half of this component and anticlockwise over the other half.

The winding 17' on the sleeve is made of similar form to the central part of the rod winding 12 and the second component of which the winding 12 can be considered to be made. With a symmetrical longitudinal flux distribution the E.M.F.'s induced in the winding 17' and in the second, parabolic component of the winding 12 are both equal to zero. In the event of inaccuracies of manufacture leading to a non-symmetrical flux distribution, however, voltages of equal magnitude are induced in winding 17' and the parabolic component.

In the circuit described above the output of the sleeve winding 17' is connected to the further feedback amplifier 34 and the longitudinal flux distribution of the sleeve is adjusted by the feedback amplifier 34 until the output from the parabolic sleeve winding 17' is zero. In this condition the output of the second, parabolic component of the rod winding 12 is also zero and the errors due to unequal flux distribution are eliminated.

With the feedback amplifier arrangement as shown in FIGURE 6, it is not necessary that the total number of turns in the sleeve winding 17' and the rod winding 12 be equal. If the turns are arranged to be equal, however, the circuit associated with the feedback amplifier 34 may be eliminated and the sleeve winding 17' connected subtractively to the output of the rod winding 12 so as to cancel the errors.

Alternatively, the feedback amplifier 33 may be eliminated and the reference supply connected directly to the terminals of the thick wire winding 18' on the sleeve. Under this condition with the sleeve winding 17' connected in series subtractively with the rod winding 12 the ratio between the voltages at the terminals of the rod winding circuit and the voltage at the thin wire winding 20' terminals is proportional to the distance between the center of the sleeve and the center of the rod winding.

Figure 7A:
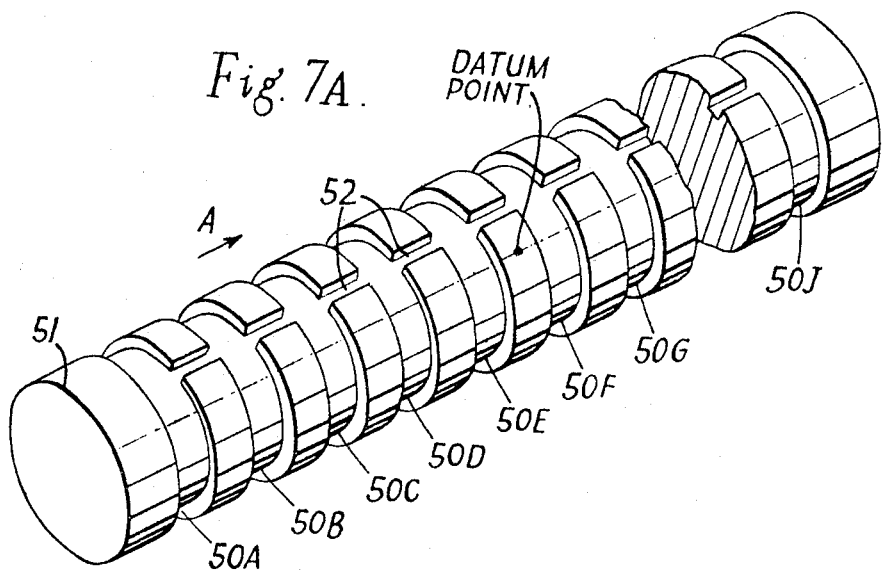
FIGS. 7A and 7B are, respectively, somewhat, schematic perspective views of a rod and sleeve of a second device according to the invention.
Figure 7B:
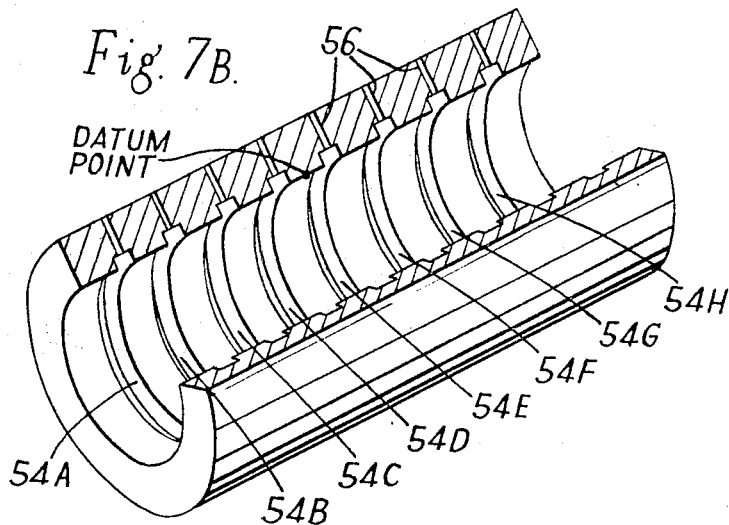

In a second device according to the invention the variable pitch helical windings and the uniform windings are replaced by equivalent windings, FIG. 7A being a schematic drawing of the rod of this second device and FIG. 7B a schematic drawing of the sleeve.

Referring first to FIG. 7A, ten equally spaced, circumferential slots 50A, B . . . J are provided on the outer surface of a rod 51 and a longitudinal slot 52 connects each of the circumferential slots to the succeeding slot. A winding, substantially equivalent to the parabolic winding 12 of FIGS. 2, 3 and 6, is formed by locating coils in respective circumferential slots 50A . . . J in the following manner. Taking a point at the center of the rod midway between slots 50E and 50F as the datum point, the coils in slots 50A . . . 50E have, respectively, 9, 7, 5, 3 and 1 turn(s). Similarly, the coils in slots 50F . . . 50J have 1, 3, 5, 7 and 9 turns, respectively.

The coils in slots 50A . . . E are wound in a clockwise sense, when the rod is viewed in the direction of arrow A, and coils 50F . . . J are wound in a counterclockwise sense. All coils are connected together in series by connecting wires respectively extending along longitudinal slots 52, and the winding resulting from this series connection of the coils is a stepwise winding equivalent to winding 12 of FIGS. 2, 3 and 6.

In FIG. 7B, eight equally spaced circumferential slots 54A . . . H are formed on the inner surface of a sleeve 55 and within these slots are disposed coils which are connected together in such manner as to produce the equivalents of parabolic winding 17' and uniform windings 18' and 21 of FIGS. 4, 4A and 6. Associated with each of the slots 54A . . . H is a radial slot or bore 56 which extends through the side wall of the sleeve.

Taking the center of the sleeve, midway between slots 54D and 54E, as the datum point, a winding substantially equivalent to winding 17' is formed by locating a coil containing 1 turn in slot 54D, three turns in slot 54C, five turns in slot 54B and seven turns in slot 54A. Similarly slots 54E . . . H are provided with coils containing one, three, five and seven turns, respectively.

All of the coils are wound in the same sense when the sleeve is viewed from one end thereof. The starts of coils 54B, C and D are connected to the ends of coils 54A, B and C, respectively, by drawing the ends of each coil through the radial slot 56 associated with the coil and soldering each end to an end of an adjacent coil. The starts of coils 54F . . . H are likewise connected to the ends of coils 54E . . . G, respectively. The finish of the coil in slot 54D is connected to the finish of the coil in 54E so that the coils in 54E . . . H are effectively wound in the opposite sense from those in slots 54A . . . D.

To form a uniform winding equivalent to winding 18, a second coil is located in each of the slots 54A . . . H. Each of these second coils contains the same number of turns and all of the second coils are connected together in series.

A winding equivalent to uniform winding 20' is formed in similar manner to that for 18'. Each of the slots 50A . . . J in FIG. 7A is preferably formed so that the plane of the slot extends at an angle to the normal axis of the rod, and the slots 54A . . . H in FIG. 7B are likewise inclined to the axis of the sleeve. The magnetic axis of each coil is therefore inclined relative to the axis of the sleeve or rod upon which it is disposed.

In a further embodiment, some of the windings are formed from coils placed in circumferential slots and other windings are helical windings on the periphery of the magnetic surfaces as above described.

I claim:
1. An electrical device for measuring the relative position of two relatively movable parts, comprising first and second elongated members which are adapted to be coupled to the respective parts so that relative movement of the parts causes relative linear movement of the members, a first distributed winding extending along the first member parallel with the direction of the relative linear movement and including oppositely wound sections extending respectively in opposed directions from a datum point on the first member, each section having a progressively varying turns density along the first member with the turns density at any selected point therealong linearly proportional to the distance of the selected point from the datum point, and a second distributed winding extending along the second member parallel with the direction of the relative linear movement, the second winding being of smaller extent than that of the first winding, whereby when the first and second members are arranged so that the location of the second winding, along a direction parallel with the direction of relative linear movement, is between the locations of respectively ends of the first winding and an A.C. potential is applied to the second winding an E.M.F. of magnitude linearly proportional to the relative positions of the said members is induced in the first winding.

2. An electrical device as claimed in claim 1, comprising a third distributed winding extending along the second member parallel with the direction of the relative linear movement, the third winding having a uniform turns density.

3. An electrical device as claimed in claim 1, comprising a third distributed winding extending along the second member parallel with the direction of the relative linear movement and inductively coupled to the second winding, the third winding having a uniform turns density, feedback amplifier means having an output connected to the said second winding, and coupling means for applying the E.M.F. induced in the third winding by an A.C. potential in the second winding to the input of the feedback amplifier means, whereby the feedback amplifier means supplies an output voltage to the second winding of such magnitude as to maintain the E.M.F. induced in the third winding at a constant magnitude.

4. An electrical device as claimed in claim 3, wherein the third winding is formed of thin wire so that the current induced therein by the A.C. potential in the second winding is of a low magnitude.

5. An electrical device as claimed in claim 2, comprising a center tap on the said third winding.

6. An electrical device as claimed in claim 1, comprising a further distributed winding extending along the second member parallel with the direction of the relative linear movement and including oppositely wound sections extending respectively in opposed directions from a datum point on the second member, each section having a progressively varying turns density along the second member with the turns density at any selected point therealong linearly proportional to the distance of the selected point from the datum point on the second member.

7. An electrical device as claimed in claim 1, comprising a further distributed winding extending along the second member parallel with the direction of the relative linear movement and including oppositely wound sections extending respectively in opposed directions from a datum point on the second member, each section having a progressively varying turns density along the second member with the turns density at any selected point therealong linearly proportional to the distance of the selected point from the datum point on the second member, the total number of turns in the further winding being equal to the total number of turns in a portion of the first winding whose center is located at the datum point and whose length is equal to the length of the further winding, and the further winding being connected to the first winding in such manner that the E.M.F. induced in the further winding by an A.C. potential applied to the second winding opposes the E.M.F. induced in the first winding.

8. An electrical device as claimed in claim 1, comprising a further distributed winding extending along the second member parallel with the direction of the relative linear movement and including oppositely wound sections extending respectively in opposed directions from a datum point on the second member, said further winding being inductively coupled to the second winding and having a progressively varying turns density along the second member with the turns density at any selected point therealong linearly proportional to the distance of the selected point from the datum point on the second member, and feedback amplifier means for applying an E.M.F. representative of the E.M.F. induced in the further winding by an A.C. potential in the second winding to the second winding, whereby the longitudinal distribution of flux generated by the A.C. potential in the second winding is varied to cause the E.M.F. induced in the further winding to tend towards zero.

9. An electrical device as claimed in claim 8, comprising a center tap on the second winding, the output of the feedback amplifier being connected to the center tap on the second winding.

10. An electrical device as claimed in claim 1, in which the second member is a tube and the first member is a rod extending through the tube coaxially thereof.

11. An electrical device as claimed in claim 1, comprising a center tap on the said second winding.

12. An electrical device as claimed in claim 1, in which the first winding comprises a plurality of coils connected in series and spaced along the first member.

13. An electrical device as claimed in claim 12, in which the first member is formed with a plurality of circumferentially extending grooves spaced apart along the member with the diametric plane of each groove extending at an angle to the normal to the axis of the first member, the coils being disposed in respective grooves, whereby the magnetic axis of each coil is inclined relative to the axis of the first member.

14. An electrical device as claimed in claim 6, in which the further winding comprises a plurality of coils connected in series and spaced along the second member.

15. An electrical device as claimed in claim 14, in which the second member is formed with a plurality of circumferentially extending grooves spaced apart along the second member with the diametric plane of each groove extending at an angle to the normal to the axis of the second member, the coils being disposed in respective grooves, whereby the magnetic axis of each coil is inclined relative to the axis of the second member.

16. An electrical device as claimed in claim 1, comprising an autotransformer connected across the first winding and having an intermediate tap.

References Cited by the Examiner
UNITED STATES PATENTS

| | | | |
|---|---|---|---|
| 2,424,766 | 7/1947 | Miner | 336—30 |
| 2,769,969 | 11/1956 | Comstock | 336—30 X |
| 3,138,772 | 6/1964 | Persons | 336—30 X |

FOREIGN PATENTS 516,392  4/1930  Germany.

JOHN F. COUCH, *Primary Examiner.*

LLOYD McCOLLUM, *Examiner.*

W. E. RAY, *Assistant Examiner.*